United States Patent Office

3,145,206
Patented Aug. 18, 1964

3,145,206
METHOD OF STABILIZING DICHLOROCYANURIC ACID SALTS
Robert J. Fuchs, Clark, and Charles B. Miles, Westfield, N.J., assignors to FMC Corporation, a corporation of Delaware
No Drawing. Filed Mar. 28, 1960, Ser. No. 17,748
7 Claims. (Cl. 260—248)

This invention relates to the stabilization of dichlorocyanuric acid salts against self-sustaining, thermally-initiated decomposition.

The chlorinated cyanuric acids are well known as a source of active chlorine in the art, and have been widely used to supply active chlorine in water supplies to prevent the growth of pathogenic bacteria in swimming pools and in detergent and sanitizing compositions. In particular, the alkali metal salts of dichlorocyanuric acid have been accepted as a convenient means for supplying active chlorine, because of their good stability which they posses under normal handling conditions. The decomposition temperature of these salts is sufficiently high as to preclude reaching the decomposition point under normal handling and storage conditions. These salts are generally produced in the form of a fine crystalline powder in order to make them readily soluble in the liquids to be treated. Coarser particles are utilized when they are sufficiently soluble.

Despite the fact that the salts of dichlorocyanuric acid are generally stable, they display an extraordinary type of decomposition which is most serious. If any portion of a bulk mass of the salt is exposed to a source of intense heat (e.g., an unextinguished match or cigarette butt) there commences a creeping self-sustaining, thermally-initiated decomposition which ultimately decomposes the entire quantity of salt. This decomposition reaction is not a true oxidation since it occurs even under vacuum conditions. Nevertheless, the effect of such decomposition is the complete destructiion of the dichlorocyanuric acid salts' ability to yield active chlorine and, consequently, removal of its primary chemical utility.

A successful method for preventing this progressive decomposition has been to include an inert filler in the salt mixture to the extent of at least 30% by weight. The inner filler appears to act as a barrier to prevent creeping of the decomposition throughout the packaged container of salt.

The inclusion of such large amounts of inert filler is highly undesirable because it adds additional handling, shipping, and packing costs for substantial amounts of nonactive-chlorine-producing substituents. Such excessive amounts of inert material are also objectionable to the consumer since excess volumes of materials must be employed and handled to produce the equivalent amount of active chlorine as smaller volumes of higher concentrated dichlorocyanuric acid salt.

It is an object of the present invention to inhibit the progressive-thermally-initiated decomposition of salts of dichlorocyanuric acid without the utilization of large amounts of inert filler.

It is a further object of this invention to inhibit this decomposition of salts of dichlorocyanuric acid with an active chlorine-supplying constituent, resulting in a stabilized dichlorocyanuric acid salt mixture containing no inert filler.

It has now been determined unexpectedly that dry salts of dichlorocyanuric acid may be inhibited from progressive, thermally-initiated decomposition by the addition of either cyanuric acid or dichlorocyanuric acid when employed in amounts below about 25%.

The amount of stabilizer required to effect stabilization varies with the particular stabilizer used. Generally, the potassium salt of dichlorocyanuric acid is more readily stabilized than the sodium salt. Therefore in the case of potassium dichlorocyanurate, about 5% of cyanuric acid stabilizer is required to obtain complete stabilization. In contrast to this the sodium salt of dichlorocyanuric acid requires about 10% of the cyanuric acid stabilizer to give complete protection against this progressive decomposition.

If desired, smaller amounts of stabilizer may be employed than those given above, by compacting a homogeneous mixture of the stabilizer and the salt of dichlorocyanuric acid, under pressure, and then regrinding the mixture to the required size.

The particle size of the salt is often maintained at about 90% −200 mesh, since one of the requirements for the active chlorine constituent is that it be readily soluble in the aqueous body to which it is added. The size of the added stabilizer is also maintained within this same range.

The combination of these additives and the salt of dichlorocyanuric acid appears to produce a synergistic stabilizing effect which cannot be obtained by merely adding equivalent amounts of inert materials. The precise method in which these stabilizers operate is not known, but it is obvious that some chemical stabilizing effect is present above and beyond a mere "filler" effect.

Although smaller amounts of cyanuric acid appears to be more effective as a stabilizer than dichlorocyanuric acid, the latter is the preferred embodiment of this invention, particularly where a high concentration of active chlorine components is desired. This is due to the ability of dichlorocyanuric acid to yield active chlorine in addition to that produced by the dichlorocyanuric acid salts. In fact, dichlorocyanuric acid yields about 35% active chlorine as against only about 30% for the salt of dichlorocyanuric acid. It is thus seen that the active chlorine content per unit weight of salt is not diminished by the dichlorocyanuric acid additive. In fact, the added stabilizer actually increases somewhat the active chlorine value per unit amount of stabilized salt.

Whenever the active chlorine content of the stabilized salt mixture need not be extremely high, it is advisable to use cyanuric acid as the stabilizer. This additive requires only small amounts (on the order of 5 to 10%) to be effective; however, it is not an active chlorine-yielding compound. Accordingly, whatever amounts of cyanuric acid are added to the salt, proportionally diminish the active chlorine-producing ability of this salt. However, since the cyanuric acid is added in relatively small amounts, the total effect is only a slight lowering of the active chlorine content of the mixture.

The following examples are presented as being illustrative of the present process and are not intended as limitative of the ingredients or amounts thereof.

EXAMPLE 1

The compositions hereinafter described in Table I were tested by placing about 15 grams of a homogeneous mixture thereof in a test tube and embedded a loop of 26-gauge Nichrome wire in the top half inch of the mixture. The wire was heated red hot by passing a current through it for a few sconds, until the material in contact with the wire had decomposed. The current was then turned off, and the composition was observed to determine whether decomposition continued in a self-contained manner throughout the whole mixture. Those mixtures in which the self-sustaining decomposition cannot be initiated in this manner are considered sufficiently stabilized.

Table I

| Sample No. | Additive | Percent Added | Salt [1] | Result |
|---|---|---|---|---|
| 1 | Dichlorocyanuric Acid. | 20 | Sodium Dichlorocyanurate. | No Decomposition. |
| 2 | ___do___ | 15 | ___do___ | Decomposed. |
| 3 | ___do___ | 20 | Potassium Dichlorocyanurate. | No Decomposition. |
| 4 | ___do___ | 15 | ___do___ | Decomposed but at Reduced Rate. |
| 5 | ___do___ | 10 | ___do___ | Decomposed. |
| 6 | Cyanuric Acid | 10 | Sodium Dichlorocyanurate. | No Decomposition. |
| 7 | ___do___ | 10 | Potassium Dichlorocyanurate. | Do. |
| 8 | ___do___ | 5 | Sodium Dichlorocyanurate. | Decomposed. |
| 9 | ___do___ | 5 | Potassium Dichlorocyanurate. | No Decomposition. |
| 10 | Dichlorocyanuric Acid. | 25 | Sodium Dichlorocyanurate. | Do. |
| 11 | Cyanuric Acid | 25 | ___do___ | Do. |

[1] Salts were approximately 90% −200 mesh.

EXAMPLE 2

The compositions hereinafter described in Table II were prepared as follows:

Sample 1 was prepared by homogeneously mixing sodium dichlorocyanurate and 10% dichlorocyanic acid. This mixture had a mesh size of +140 −40. Sample 2 was prepared in exactly the same manner, containing exactly the same proportion of ingredients. However, in Sample 2 the homogeneous mixture was additionally compacted under high pressure; the resultant mass was then completely reground to +140 −40. These compositions were then tested for progressive, thermally-initiated decomposition in the same manner as described in Example 1.

Table II

| Sample No. | Additive | Percent Added | Salt | Result |
|---|---|---|---|---|
| 1 | Dichlorocyanuric Acid. | 10 | Sodium Dichlorocyanurate. | Decomposed. |
| 2 [a] | ___do___ | 10 | ___do___ | No Decomposition. |

[a] Compacted and reground.

EXAMPLE 3

The procedure of Example 2 was followed using the same concentration of additive except that the potassium salt of dichlorocyanuric acid was employed instead of the sodium salt of dichlorocyanuric acid. The untreated homogeneous mixture decomposed. The second mixture which was compacted and reground did not decompose.

The results tabulated in Table I clearly demonstrate the greater effectiveness of cyanuric acid compared to dichlorocyanuric acid. Additionally, the relative ease of stabilizing the potassium salt of dichlorocyanuric acid compared with the sodium salt thereof is clearly demonstrated. The employment of larger amounts of inhibitor will also effectively stabilize the salts of dichlorocyanuric acid, but no advantage is obtained by using excess amounts over and above those quantities which have been found suitable, since no higher degree of stabilization is obtained.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed is:

1. The method of stabilizing dry alkali metal salts of dichlorocyanuric acid against self-sustaining, thermally-initiated decomposition which consists essentially of adding to said salts a compound selected from the group consisting of dichlorocyanuric acid and cyanuric acid in a dry state and in stabilizing amounts below about 25% by weight.

2. The method of stabilizing dry alkali metal salts of dichlorocyanuric acid against self-sustaining, thermally-initiated decomposition which consists essentially of adding to said salts dichlorocyanuric acid in a dry state and in stabilizing amounts below about 25% by weight.

3. The method of stabilizing dry alkali metal salts of dichlorocyanuric acid against self-sustaining, thermally-initiated decomposition which consists essentially of adding to said salts cyanuric acid in a dry state and in stabilizing amounts below about 25% by weight.

4. The method of claim 2, where the salt is sodium dichlorocyanurate.

5. The method of claim 2, where the salt is potassium dichlorocyanurate.

6. The method of stabilizing dry salts of dichlorocyanuric acid against self-sustaining, thermally-initiated decomposition which consists essentially of adding to said salts a compound selected from the group consisting of dichlorocyanuric acid and cyanuric acid in a dry state and in stabilizing amounts below about 25% by weight, compacting the resultant mixture under pressure and regrinding the compacted mass.

7. The method of stabilizing dry potassium dichlorocyanurate which consists essentially of adding dry dichlorocyanuric acid to dry potassium dichlorocyanurate in stabilizing amounts up to about 15% by weight, and homogeneously mixing these materials.

References Cited in the file of this patent

UNITED STATES PATENTS

| 2,578,270 | Strain | Dec. 11, 1951 |
| 2,913,460 | Brown et al. | Nov. 17, 1959 |

UNITED STATES PATENT OFFICE
CERTIFICATE OF CORRECTION

Patent No. 3,145,206

August 18, 1964

Robert J. Fuchs et al.

It is hereby certified that error appears in the above numbered patent requiring correction and that the said Letters Patent should read as corrected below.

Column 1, line 26, for "liquids" read -- liquid --; line 39, for "destructiion" read -- destruction --; line 45, for "inner" read -- inert --; column 2, line 28, for "appears" read -- appear --; line 61, for "embedded" read -- embedding --; line 64, for "sconds" read -- seconds --; column 3, line 31, for "dichlorocyanic" read -- dichlorocyanuric --; column 4, lines 11 and 12, for "exemplifled" read -- exemplified --.

Signed and sealed this 8th day of December 1964.

(SEAL)
Attest:

ERNEST W. SWIDER
Attesting Officer

EDWARD J. BRENNER
Commissioner of Patents